(12) United States Patent
Komljenovic

(10) Patent No.: US 11,353,661 B1
(45) Date of Patent: Jun. 7, 2022

(54) INTEGRATED MULTIPLEXER WITH IMPROVED PERFORMANCE

(71) Applicant: Tin Komljenovic, Goleta, CA (US)

(72) Inventor: Tin Komljenovic, Goleta, CA (US)

(73) Assignee: Nexus Photonics LLC, Santa Barbara, CA (US)

( * ) Notice: Subject to any disclaimer, the term of this patent is extended or adjusted under 35 U.S.C. 154(b) by 0 days.

(21) Appl. No.: 17/147,496

(22) Filed: Jan. 13, 2021

(51) Int. Cl.
*G02B 6/293* (2006.01)
*G02B 6/12* (2006.01)
*H04J 14/02* (2006.01)
*H04B 10/66* (2013.01)

(52) U.S. Cl.
CPC ..... *G02B 6/29364* (2013.01); *G02B 6/12009* (2013.01); *G02B 6/29362* (2013.01); *G02B 6/29382* (2013.01); *G02B 6/29383* (2013.01); *H04J 14/0202* (2013.01); *H04J 14/0209* (2013.01); *G02B 2006/12164* (2013.01); *H04B 10/66* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 6,404,948 B2 * | 6/2002 | Alexander | ......... | G02B 6/12019 385/15 |
| 6,735,361 B2 * | 5/2004 | Gilliland | .............. | G02B 6/3869 385/37 |
| 10,715,271 B1 * | 7/2020 | Cox | ................... | G02B 6/29364 |
| 2001/0012424 A1 * | 8/2001 | Kato | .................. | G02B 6/12007 385/24 |
| 2004/0228602 A1 * | 11/2004 | Livas | ................... | H04B 10/077 385/140 |
| 2009/0226171 A1 * | 9/2009 | Liu | ...................... | G02B 6/2938 398/82 |

FOREIGN PATENT DOCUMENTS

| | | | |
|---|---|---|---|
| FR | 2816062 A1 * | 5/2002 | |
| WO | WO 2020/088746 A1 * | 5/2020 | |
| WO | WO 2021/081323 A1 * | 4/2021 | |

OTHER PUBLICATIONS

Recommendation ITU-T G.694.1, version Oct. 2020, retrieved via https://www.itu.int/rec/T-REC-G.694.1-202010-I/en . (Year: 2021).*

* cited by examiner

*Primary Examiner* — Michael Stahl
(74) *Attorney, Agent, or Firm* — Shalini Venkatesh

(57) ABSTRACT

A device includes a module comprising an arrayed waveguide grating (AWG), and a filter having a filter input port, a filter output port, and a filter COMM output port. The filter is operable such that a first range of wavelengths entering the filter at the filter input port is directed to the filter output port and a second range of wavelengths entering the filter at the filter input port is directed to the COMM output port. The AWG includes an AWG input port optically coupled to the filter output port to receive the first range of wavelengths, and a plurality of AWG output ports.

6 Claims, 9 Drawing Sheets

INTEGRATED MULTIPLEXER WITH IMPROVED PERFORMANCE

FIELD OF THE INVENTION

The present invention relates to optical networks and systems. More specifically, certain embodiments of the invention relate to an apparatus and associated methods for realization of photonic integrated circuit (PIC) based multiplexers and demultiplexers with improved performance.

BACKGROUND OF THE INVENTION

In fiber-optic communications, wavelength-division multiplexing (WDM) is a technology which multiplexes a number of optical carrier signals (or channels) onto a single optical fiber by using different wavelengths (i.e., colors) of laser light. This technique enables bidirectional communications over one strand of fiber, as well as multiplication of capacity in each direction.

The use of multiple carriers significantly increases total bandwidth with some modern systems routinely handling more than 160 signal channels carrying data rates of about 100 Gb/s, providing over 16 Tb/s capacity over a single fiber. In test environments, much higher single fiber bandwidths have been accommodated. The use of multiple wavelengths also enables additional functionality where certain wavelengths can be dropped at particular locations to serve subset of users as e.g. in access networks, mobile backhaul and more recently fronthaul. Finally, WDM is used in the majority of internet backbone networks, as well as for local connectivity in e.g. data centers. In short, the use of WDM is ubiquitous in optical networks that form a pillar of modern interconnectivity.

Multiplexers and demultiplexers (which operate on essentially identical principles to provide complementary functionality) are key components of such WDM networks. A multiplexer (MUX) can combine one or more wavelengths from two or more input ports and combine them into one or more output ports, while a demultiplexer (DEMUX) can separate one or more wavelengths from an incoming set of wavelengths in one or more input ports and route them into different outputs. For brevity, in the rest of the disclosure, when using acronym MUX we are referring to MUX, DEMUX and/or both unless specifically stated otherwise.

Various types of spectral filters can provide such functionality, with varying levels of performance as characterized by insertion loss, crosstalk, polarization sensitivity and other parameters relevant to the operation of optical networks. A single wavelength can be dropped or added by using a simple fiber grating filter with a circulator, but such systems do not scale well to large channel counts due to inherent complexity in cascading filters and circulators.

For networks capable of dealing with a large number of wavelengths, MUX functionality is generally achieved using arrays of compact filters, such as thin film filters (TFFs), or using arrayed waveguide gratings (AWGs). TFFs in particular provide excellent performance, especially in terms of insertion loss, channel crosstalk, polarization performance and operating temperature range, but they scale poorly in terms of cost for larger channel counts due to a need for multiple fiber attach points and multiple fiber splices, as indicated by FIG. 1. More complex packaging is therefore entailed. A big advantage of TFFs for MUXs is the ability to drop (or add) arbitrary channels while transmitting all other channels.

AWGs, the other main option for MUXes, also provide very good performance, although they are typically inferior to TFFs in terms of insertion loss (except potentially for large channel counts, typically >20 channels), channel crosstalk, polarization performance and most importantly operating temperature range. A benefit of AWGs is simplified packaging with reduced number of fiber attach points. AWGs can be realized in multiple photonic integrated circuit (PIC) platforms including planar-lightwave circuit (PLC), silicon-nitride (SiN), silicon (Si), indium-phosphide (InP) or others, each material system having well known advantages and disadvantages. A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves.

Commercially, PLC based AWGs are the most common choice for MUXes in high channel count networks, as they provide superior performance related to multiplexing/demultiplexing (compared to other platforms e.g. Si, InP or SiN) although they do not support additional functionality such as photodetection, amplification etc. as would be supported by e.g. Si and/or InP platforms. Additional functionality would be beneficial in some applications, especially in longer reach networks where total system losses can become a limiting factor (amplifiers) and/or when precise power control is needed (e.g. where photodetectors are involved).

One important disadvantage inherent to AWG based MUXes is that, because all channels are multiplexed or demultiplexed together, partial channel demultiplexing (e.g. separating only 4 channels from a 40 channel incoming stream, leaving the other 36 to continue as a batch in one output path) is not practical, at least prior to the present invention, as will be described with help of FIG. 2. Another important limitation of AWG based MUXes is their reduced operating temperature range compared to TFFs even when athermal designs are employed, which sometimes prevents their application in remote areas that require extremely wide temperature range (e.g. from −40° C. to +85° C.).

There is, therefore, a need for a MUX that provides performance and functionality comparable with TFF based MUXes, but at reduced complexity and fabrication cost, comparable to or lower than, typical AWG based MUXes. Furthermore, a PIC-based MUX design that allows the integration of additional active functionality such as photodetection for monitoring the power levels and amplification for boosting the output power would be extremely beneficial.

DETAILED DESCRIPTION

Described herein are embodiments of a system and associated methods for realization of multiplexers and/or demultiplexers using photonic integrated circuits with improved performance and additional functionality.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Figure 1:
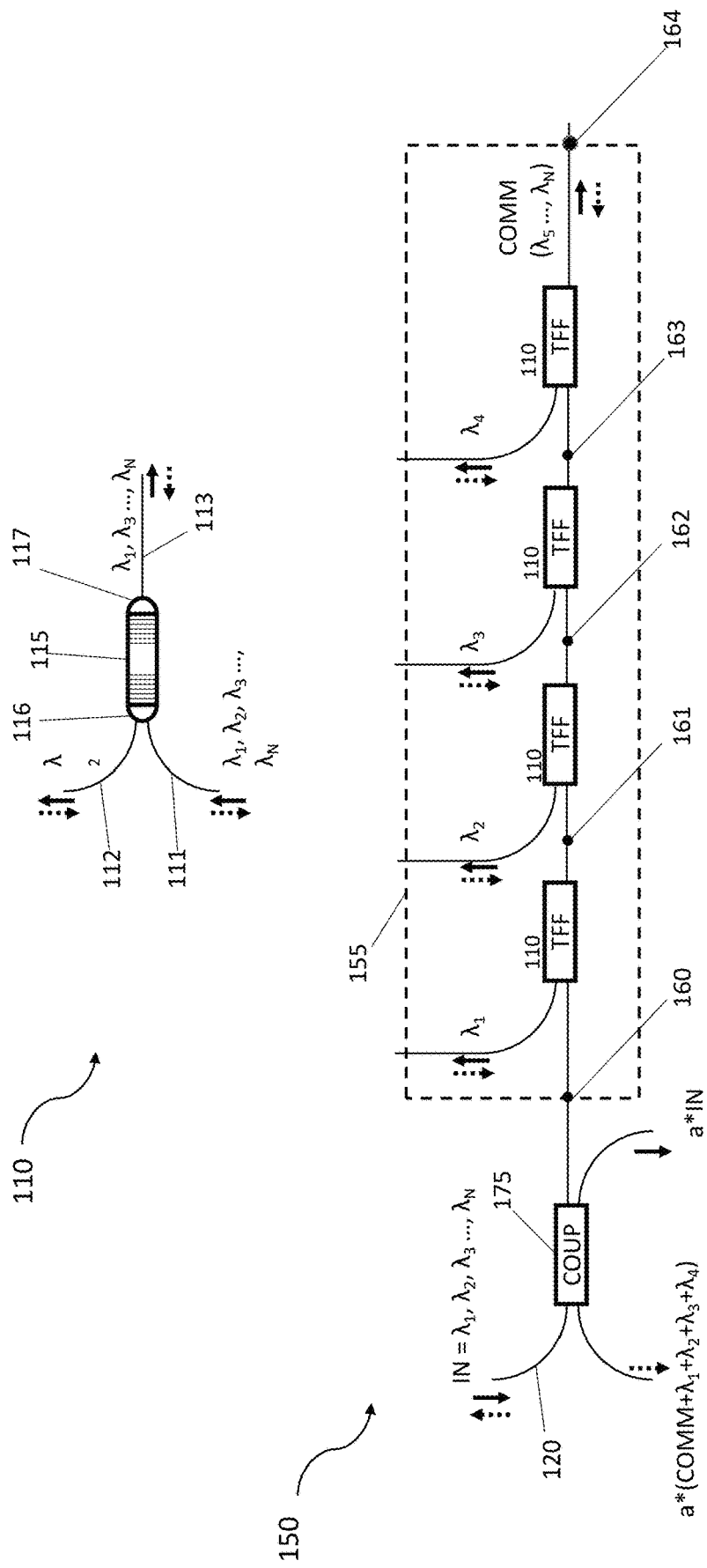
FIG. 1 (Prior Art) shows a top down view of a prior art device based on TFFs.

FIG. 1 illustrates a 4-channel MUX 150 typical of prior art, made up of a cascade of 4 TFFs 110 and a standard splitter/coupler 175. MUXes of smaller or larger channel count (numbers as large as 80, 160 or even more are quite feasible) follow the same general design. The device, like the other devices disclosed in this disclosure, is capable of bidirectional operation, where the terms "input" and "output" are interchangeable, according to whether the direction of operation is "upstream" or "downstream", as will be made clearer in the detailed descriptions below. In FIG. 1, solid arrows indicate downstream (DEMUX) operation and dashed arrows indicate upstream (MUX) operation This same convention is used in FIGS. 2-5 and 7.

Downstream (DEMUX) operation of device 150 will be considered first.

FIG. 1 shows a typical TFF 110, including filter body 115 and three attached fibers 111, 112, and 113. Fiber 111 receives inputs at multiple wavelengths, fiber 112 carries one of those wavelengths away as the dropped wavelength, and fiber 113 lets the remaining wavelengths through. The positions of particular fibers (e.g. dropped wavelength fiber 112 and remaining wavelengths fiber 113) might be switched, depend on the design of the TFF 110. A challenge for fabrication is the fiber attach required for at least two ports of 115, one for region 116 for fibers 111 and 112, and one for region 117 for fiber 113. In some cases, separate fiber attach processes have to be carried out for fibers 111 and 112, meaning three fiber attaches are required in total. TFF body 115 is usually made up of a central glass spacer with multilayer coating(s) deposited on one or both end faces. In the illustrated example there are two such coatings, suggested with multiple thin lines, deposited, one on the left and one on the right side of 115 in the view illustrated. In some applications, filters of other types than TFFS may be used.

Now consider TFF based MUX 150, shown in the lower part of FIG. 1, operating in DEMUX mode, where, as noted above, the direction of each optical signal flow is indicated by a solid arrow. Element 175, a standard splitter/coupler (SC), is an optional element in the present invention, but may be useful is providing power monitoring capability, as in the embodiment shown. Where SC 175 receives input signals through fiber 120 at N wavelengths, it allows a small amount of that power (a*IN) to be tapped off for power monitoring. The wavelength dependence of the splitting ratio is negligible in the range of wavelengths over which MUX 150 is designed to operate. A typical value of the fraction tapped off is −20 dB, but depending on the application, other values may be used.

The remainder of the power in the input signals (or all of the power if 175 is not present) reaches the first filter 110 in an array of TFFs, each filter in turn "dropping" a particular wavelength—which is effectively the same as providing an output signal channel carrying information at that wavelength—and letting other wavelengths through to an adjacent filter until the last filter in the array is reached. Each TFF is individually packaged with fiber leads, as shown in 110, and then corresponding fibers have to be spliced at each junction (160-163). The complicated packaging increases cost for larger channel counts, a drawback that is a major driver for the present invention.

Signal channels carrying information on the one or more wavelengths that are not dropped at any one of the filters exit MUX 150 through the COMM port 164. Access to this remaining batch of wavelengths is an important distinction of TFF based MUXes and beneficial in many cases. The embodiment shown has 4 filters, that act to demultiplex 4 of the N wavelengths entering the device, while the N−4 remaining wavelengths are output at 164.

Upstream operation of element 150, acting as a MUX rather than DEMUX, is in essence a reversal of the processes just described, where optical signal flows are indicated by dashed arrows. At each filter one individual wavelength is added to any wavelengths already entering that filter from previous filters in the array and from the COMM port 164, and the accumulated combination is provided as an output at 160. If optional SC 175 is present, a small fraction of the power (a*(COMM+λ1+λ2+λ3+λ4)) is optionally provided for power monitoring and the remainder passes through 175 as an output from fiber 120.

Figure 2:
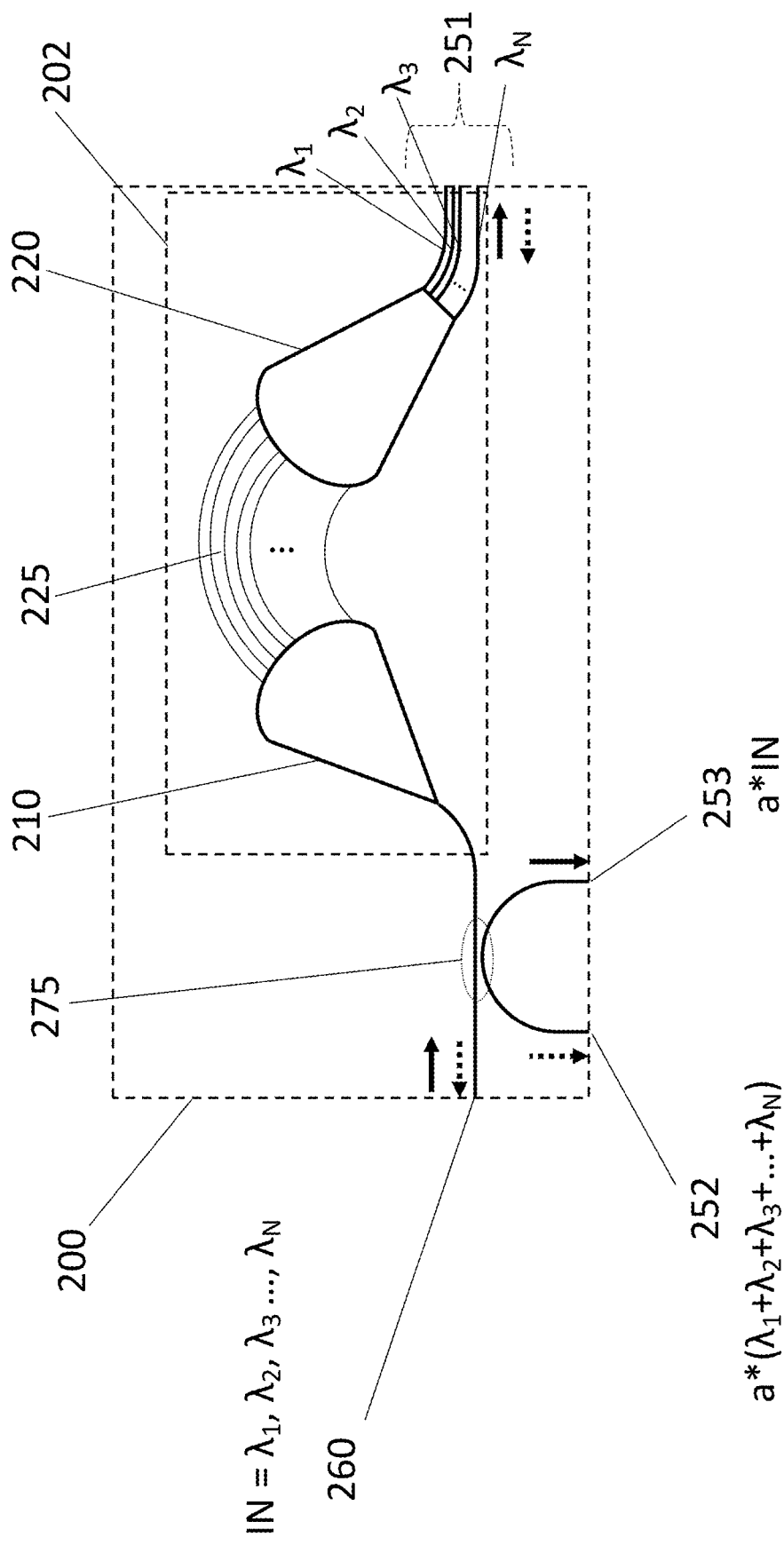
FIG. 2 (Prior Art) shows a top-down view of a prior art device based on AWGs.

FIG. 2 illustrates an N-channel MUX 200 typical of prior art, made up of an N-channel arrayed waveguide grating 202 and a splitter/coupler 275. As in the case of FIG. 1, SC 275 is an optional element in MUX 200, but may be useful in providing power monitoring at port 253 (for DEMUX operation) and port 252 (for MUX operation). Device 200 is a PIC device or module, that may be fabricated in any of a variety of platforms (PLC, Si, SiN, InP, etc).

Consider a DEMUX mode of operation. SC 275 operates just as SC 175 in FIG. 1, providing most of the power entering it through module input port 260 to a free propagating region 210 of AWG 202. Region 210 is shown as having one input and N outputs, corresponding for simplicity to N input wavelengths, but in other embodiments, any number larger or equal to 1 may be present at either end of the region. Each output or "arm" of the region is a waveguide, housed in or fabricated into module 200, and feeding into free propagating region 220 of AWG 202. Region 220 is shown as having N outputs at ports 251, for simplicity, but other unshown embodiments may have fewer, but at least one, such output. AWG operation and design optimization considerations are well known in the art and will not be discussed further. One characteristic of AWG based MUXes is the inherent lack of any COMM port, although their intrinsically cyclic nature means that each output 251 can carry multiple wavelengths separated by the free-spectral range of AWG 202. This means it is not possible to drop only a few channels out of a larger number, which limits applicability in certain networks. Another drawback is that temperature sensitivity of AWGs is typically larger than that of TFFs even if athermal designs are utilized.

Figure 3:
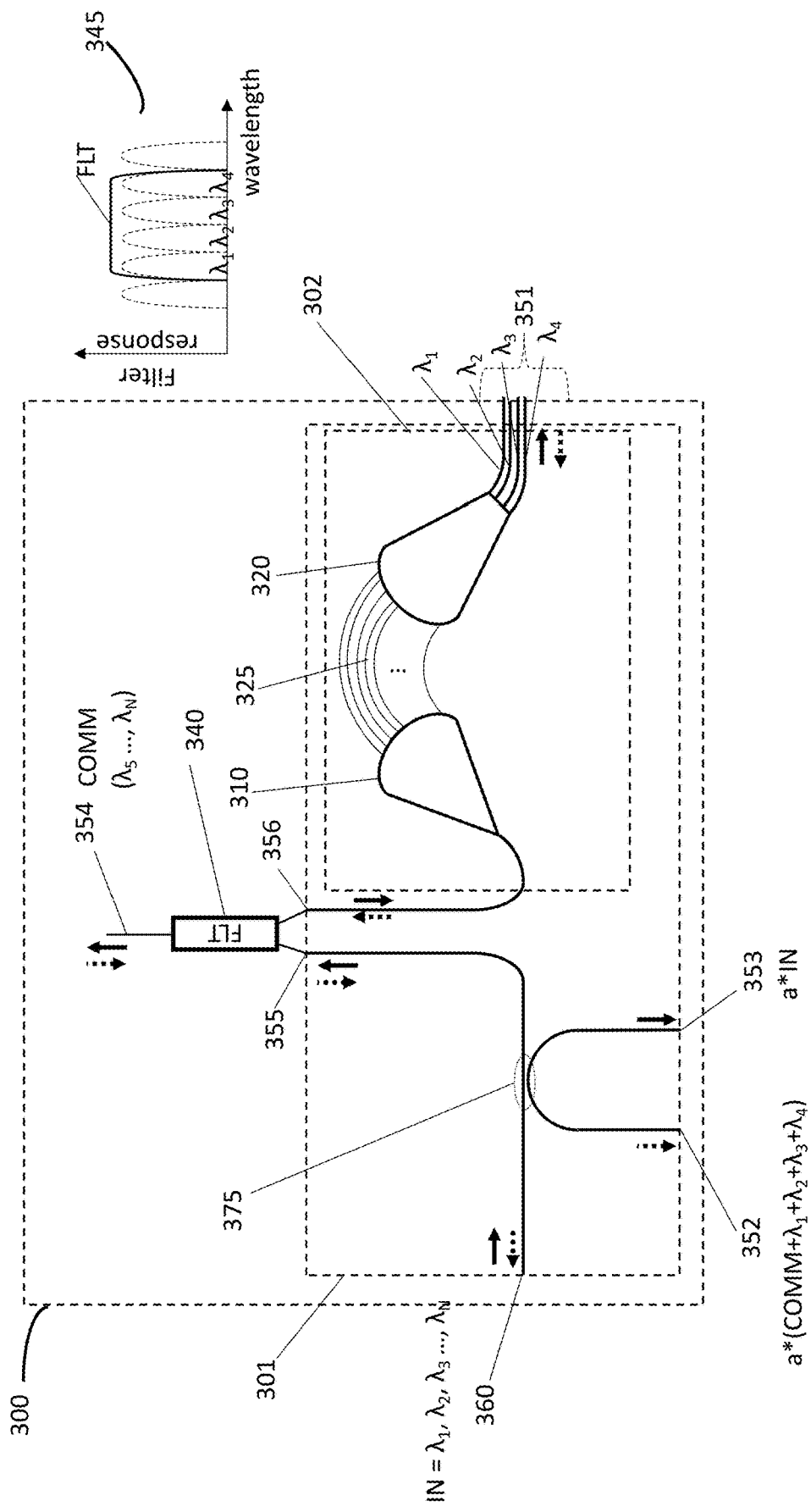
FIG. 3 illustrates a device according to one embodiment of the present invention.

FIG. 3 illustrates a MUX 300 according to one embodiment of the present invention. The significant difference between this and prior art AWG-based devices (such as 200 in FIG. 2) is the inclusion of a filter as well as an AWG, the latter (302) comprising free propagating regions 310 and 320 and arms 325 in module 301, while filter 340 is connected to module 301 by fiber attachments at 355 and 356. In downstream (DEMUX) operation, filter 340 acts to divert one range of wavelengths entering MUX 300 and module 301 at input port 360 and entering the filter through port 355 into a COMM module output at port 354. Wavelengths outside that "dropped" range are routed back into the module through port 356 before they encounter AWG 302 where they are demultiplexed in the normal way, and delivered as separate outputs at AWG output ports (which are effectively module output ports) 351.

If optional SC 375 is not present, input signals may reach filter 340 from an external source, entering the filter via an input port (such as port 360) of module 301, or via port 355 of the filter, without previously entering module 301. Alternatively, input signals may be delivered to filter 340 via a waveguide coupled into port 355 from some other upstream component (not shown) integrated into MUX 300.

This arrangement allows a select number of wavelength channels (4 in the case shown, as illustrated by filter response curves in graph 345) to be sent back into module 301 of MUX 300 to be demultiplexed at the MUX location, while other channels in the input signal can be passed on through the COMM port, to be provided to other locations or devices (not shown) for later processing (which may include DEMUX) as and when desired.

Of course, operation of device 300 in the upstream direction is also possible, as indicated by the dashed arrows, with separate wavelength channels entering module 301 at ports 351, being multiplexed by AWG 302, leaving the module at port 356 to reach filter 340, and recombining there with one or more channels entering through COMM port 354, before returning to module 301 and eventually exiting the module though port 360.

In the embodiment of FIG. 3, SC 375, analogous to SC 275, is also present in module 301, operating in the same way as 275 to provide power monitoring outputs in either MUX or DEMUX operation of the device. Not all embodiments include a splitter/coupler.

In some embodiments, module 301 is a PIC, in which all parts of AWG 302 are implemented as planar waveguides, as is any splitter/coupler present.

In some embodiments, the AWG provides MUX functionality for channels overlaying the ITU grid commonly employed in DWDM systems. In some embodiments, the channel spacing is substantially equal to 50 GHz, 100 GHz or 200 GHz. In yet other embodiments, the channel spacing is equal to 75 GHz or can be any other spacing as determined by WDM architecture employed in the overall system.

Figure 4:
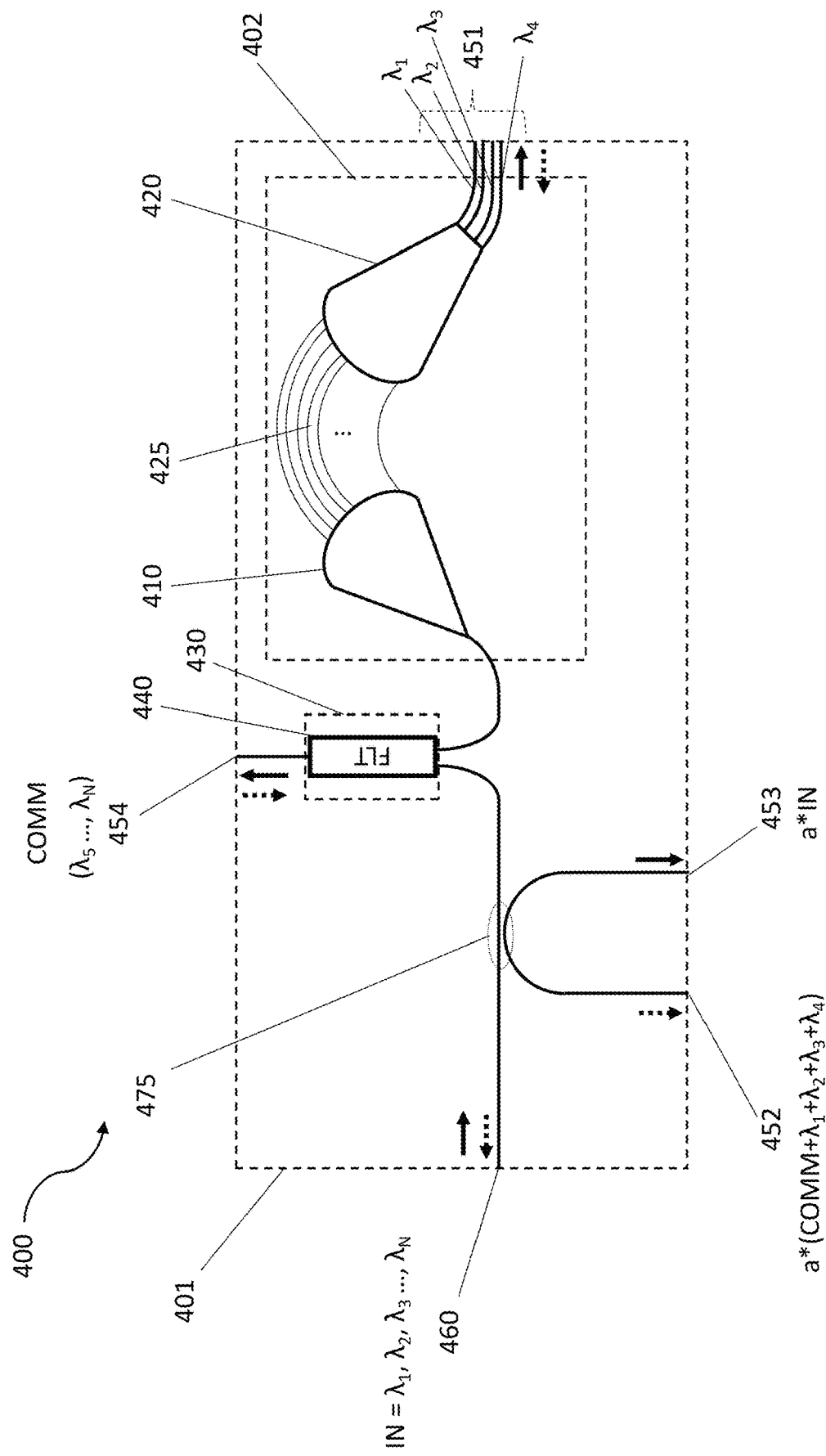
FIG. 4 illustrates a device according to another embodiment of the present invention.

FIG. 4 illustrates a top-down view of an AWG-based MUX 400 in which module 401, including the AWG (402) and optional SC (475) is a PIC, and rather than the filter 440 being positioned external to the module, the filter is inserted into a cavity or pocket 430 created in the top surface of the module using a deep silicon etching process or some other similar etching or material removing technique. The filter may be a TFF or some other type providing equivalent functionality. The significant simplification afforded by embodiments such as 400 of the present invention is the avoidance of fiber attach connections between the filter and the module, as all intra-module connectivity is achieved compactly and conveniently within the footprint of module 401, using planar waveguides. AWG 402 comprises free propagating regions 410 and 420 and arms 425, providing equivalent functionality to AWG 302 described in more detail with the help of FIG. 3. Optional SC 475 has power monitoring outputs provided at ports 452 and 453. Input/output locations 451, 452, 453, 454, and 460 provide functional equivalence to input/output locations 351, 352, 353, 354 and 360 as described with the help of FIG. 3.

Figure 5:
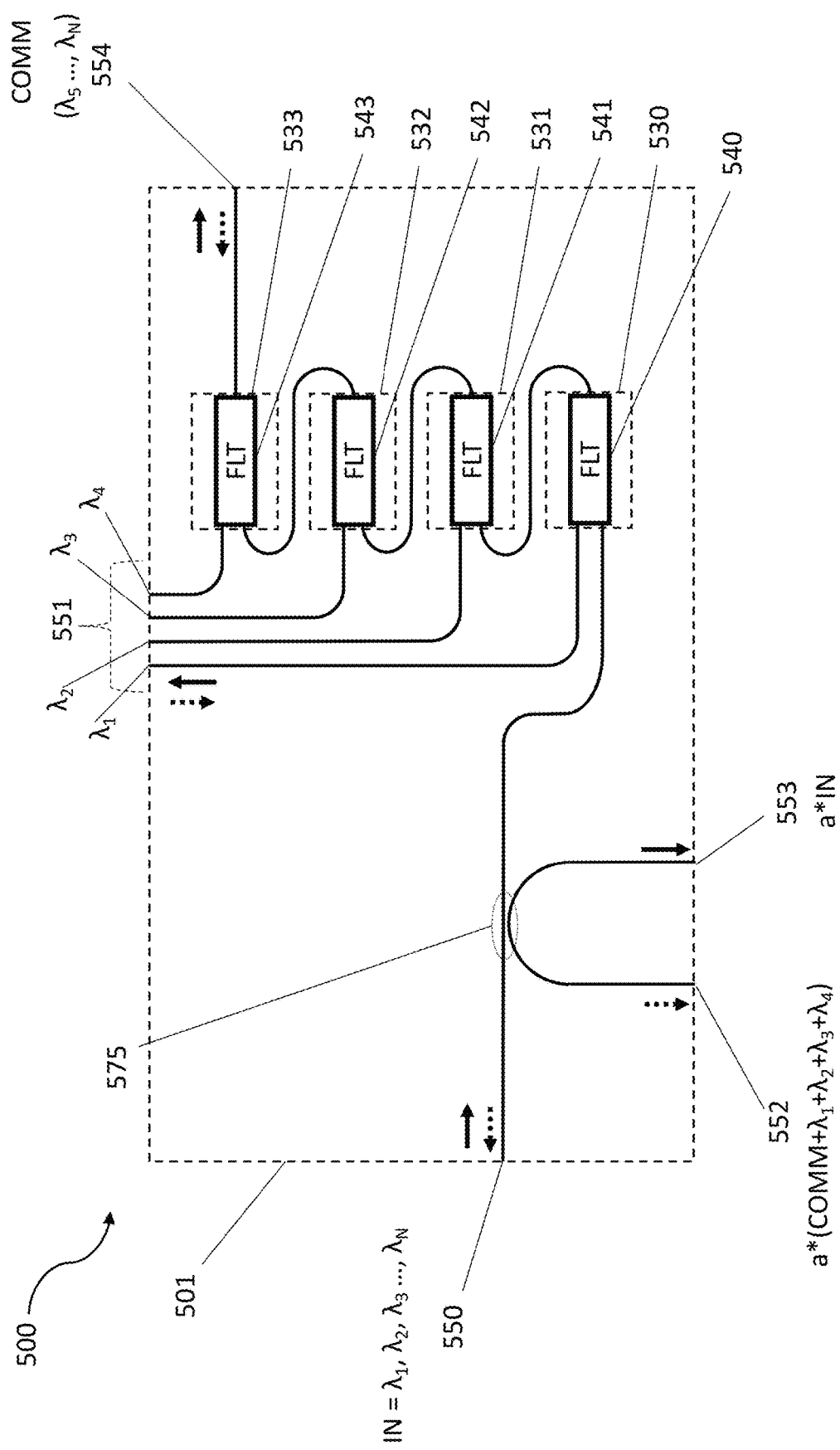
FIG. 5 illustrates a device according to yet another embodiment of the present invention.

FIG. 5. illustrates a top-down view of a different embodiment 500 of the present invention that, like 150 in FIG. 1, depends on an array of filters (shown as 540 through 543) rather than an AWG, but uses a PIC module 501 to house them in a corresponding array of cavities (shown as 530 through 533) formed into the top surface of the module. Planar waveguides in the PIC are used to provide optical routing and coupling not only to the first filter 540 in the array from module input port 550 (via optional SC 575 with power monitoring outputs provided at ports 552 and 553) but also between adjacent filters in the array, from each filter to a corresponding output at module output ports 551, and from the last filter (543 in the 4-channel case illustrated) to module COMM port 554. Each filter in the array "drops" one or more corresponding wavelengths, routing all other wavelengths entering the filter to the next filter in line, until the last filter operates to drop its own one or more wavelengths and deliver all remaining wavelengths to port 554.

This MUX design allows for mass fabrication of the PIC and simpler alignment/attach processes for the filters. Alignment tolerances can be relaxed because with appropriately sized cavities, the main factor is angular alignment, which does not impose stringent requirements because the PIC waveguides can be designed to have relatively large acceptance angles. In other words, fabrication parameters can be readily optimized for ease of assembly. This embodiment has the advantage, like the embodiments of FIG. 3 and FIG. 4, of providing COMM functionality, but can also provide improved performance as its wavelength filtering is carried out entirely by discrete filters (typically TFFs) rather than by an AWG.

Figure 6:
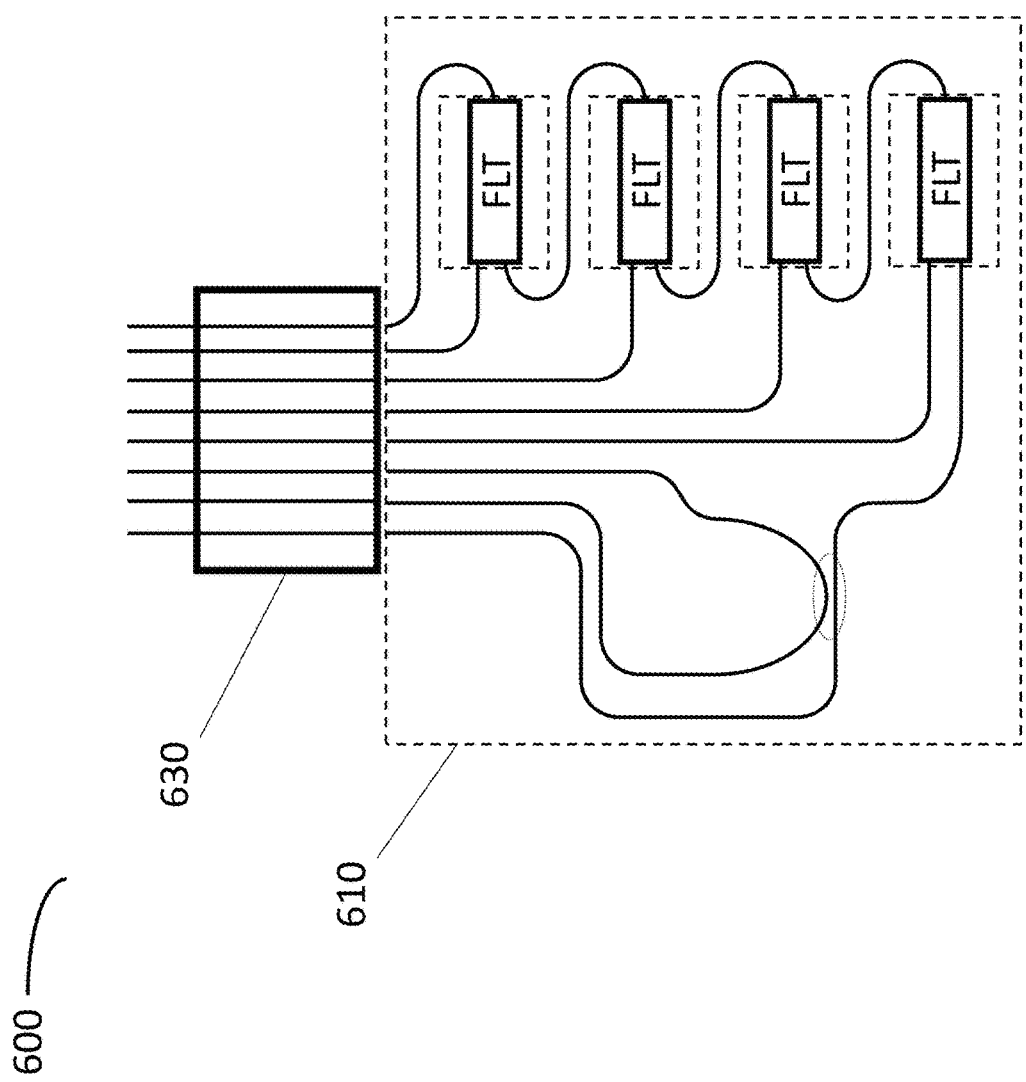
FIG. 6 illustrates a device according to yet another embodiment of the present invention.

Mass fabrication of a complete device that includes a PIC module and its corresponding fiber attachments can be further simplified, as a complete optical I/O block with fibers (bare or pigtailed) can be attached to the PIC module in a single step as illustrated in FIG. 6. The complete PIC module functionality can be realized in a single chip as described in relation to FIG. 5, and with on-chip waveguide routing complete optical I/O can be localized to a single side of the module/chip 610. Multiple fibers can be aligned simultaneously using V-grooves in block 630 or using other types of multi-IO devices, where fiber pitch in some embodiments is substantially equal to 127 μm, 250 μm or any other fiber pitch. Pitch can be further reduced if mode conversion structures, such as e.g. Pitch Reducing Optical Fiber Arrays, are used. In some embodiments, pitch at the module I/O device can be substantially equal to 20 µm, 12 µm or any other suitable pitch. In some embodiments part of module 610 functionality can be external and additional fiber coupling may be required, as indicated, for example, in FIG. 3 at 355 and 356.

Figure 7:
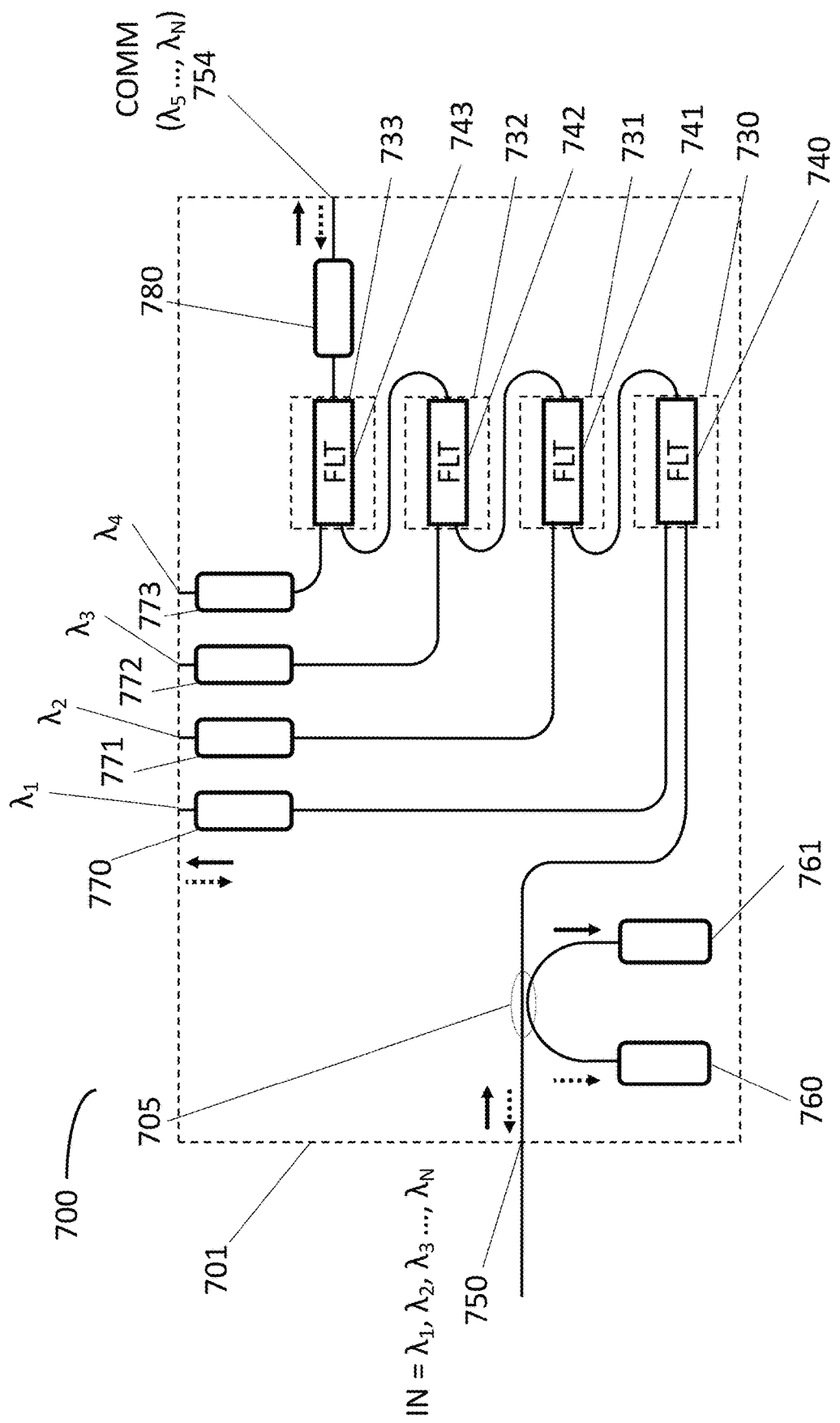
FIG. 7 illustrates a device according to yet another embodiment of the present invention.

FIG. 7 illustrates a top-down view of an embodiment MUX 700 of the present invention that, like MUX 500 in FIG. 5, depends on an array of filters (shown as 740 through 743) rather than an AWG, and uses a PIC module (701) to house them in a corresponding array of cavities (shown as 730 through 733) formed into the top surface of the module. Planar waveguides in the PIC are used to provide optical routing and coupling, and the functionality of the array of filters and optional SC 705 is equivalent to the functionality of the corresponding components described in relation to FIG. 5. The photonic integration platform in which PIC module 701 is realized differs from that of FIG. 5 in supporting one or more optional active components such as photodetectors, amplifiers, and variable attenuators. In the embodiment shown in FIG. 7, photodetectors 760 and 761 can provide on-chip power monitor capabilities, removing a need for external power monitors as in previous embodiments. Also in the shown embodiment, optical power control for each dropped channel is provided by optical amplifiers 770 through 773, where per-channel power control can be used to optimize the system performance, and COMM channel optical amplifier 780 can provide optical power control for all wavelengths in the COMM input/output 754. In other embodiments, not shown, one or more of the optical amplifiers are replaced with variable optical attenuators and/or switches. Other variations, including per channel monitor photodetectors (not shown) are possible.

PIC modules of the embodiments described above (301, 401, 501, 610 or 701) can be made in various photonic integration technology platforms. A common platform used for AWGs is the silica platform where doped waveguides provide ultra-low loss, low crosstalk, low polarization dispersion, low polarization dependent loss and easy implementation of athermalization. The functionality of modules 301, 401, 501 and 610 can be provided with silica integrated photonics. In some cases, especially for very high volumes, there might be benefits in using silicon wafers and CMOS manufacturing, which offers simplified deep etching (to integrate arrays of filters as described above) and the potential to integrate active components. To provide low-loss and other important parameters, silicon-nitride (SiN) waveguides realized on top of silicon wafer might be preferred compared to silicon waveguides. In such embodiments, SiN layer is deposited on top of oxidized Si wafer or other types of cladding separating underlying Si and waveguide layer SiN can be used. SiN waveguides provide very low loss, and low-crosstalk, and have relatively low sensitivity to thermal effects, but generally have larger polarization dependent performance (different propagation loss, bend radius, modal refractive index for TE and TM modes). Their limitations are mostly related to fabrication constraints, where SiN layers typically have a thickness limitation due to deposition technique and stress buildup, and waveguide width limitation due to lithography limitations and general process variations.

Figure 8:
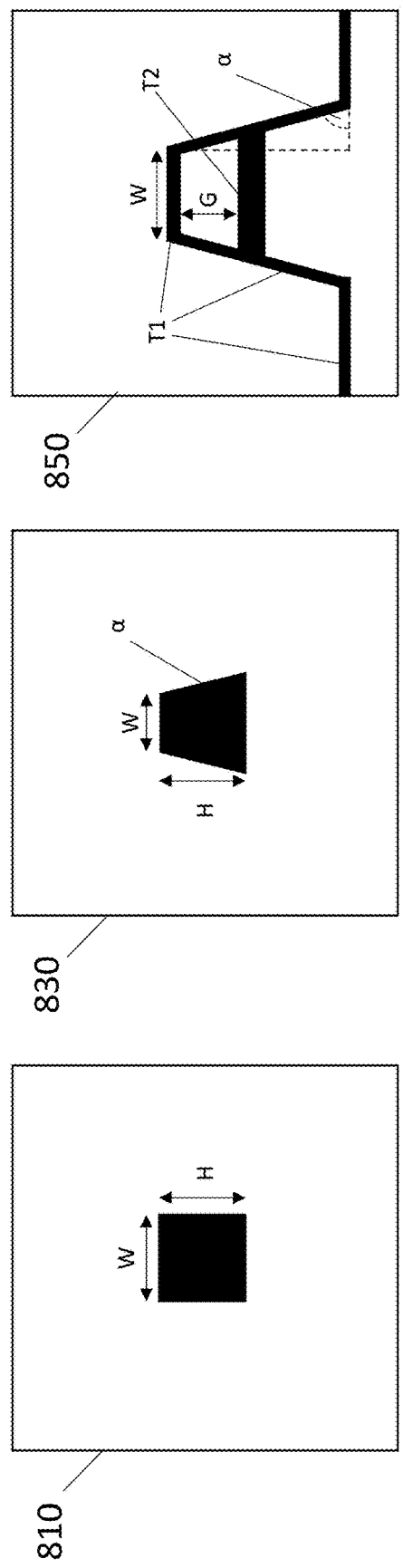
FIG. 8 shows cross-section side views of devices according to several embodiments of the present invention and optimization of waveguide cross-section dimensions.
Figure 8:
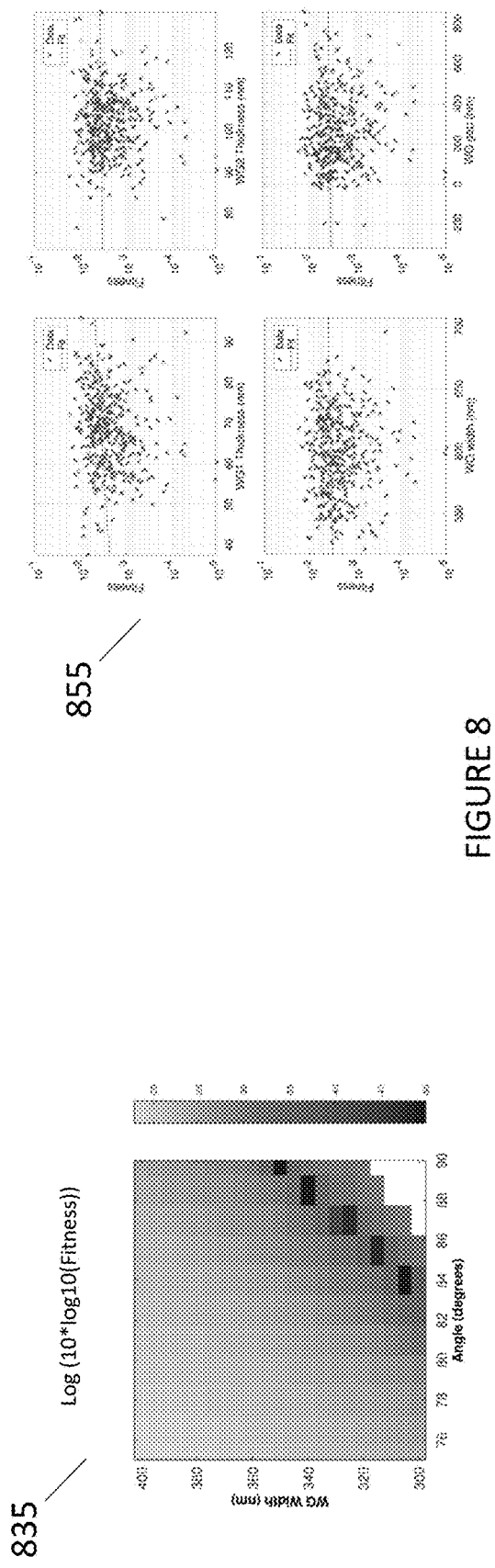

The performance of SiN waveguides can be improved with design as shown in FIG. 8. In an ideal case, a symmetric waveguide cross-section, width (W) is equal to height (H), as sketched in 810 would support TE and TM modes with identical phase, group velocities, mode sizes, bend radiuses, etc. Such geometry can be challenging to manufacture. In practice, the waveguide will generally have sidewalls that are not perfectly perpendicular to the waveguide top and bottom surfaces, meaning there will be a non-90 degrees sidewall angle (a) as a result of realistic etch processes as shown in 830. In the case of 830, the top width (W) is defined lithographically, but the bottom width is a function of sidewall angle (a), layer thickness (H) and top width (W). Due to the resulting lack of symmetry in TE and TM planes, the optical characteristics of TE and TM modes will differ and can result in the fabricated module having an increased polarization sensitivity. In such a case, the performance in terms of supporting both polarizations can be optimized by optimizing the top width (W) if fabrication process statistics are known. Such optimization is a straightforward matter to be implemented in e.g. commercial general purpose electromagnetic solvers, using global optimization techniques or similar techniques to optimize particular characteristics of a system. A fitness function (F) can be defined as F=neff1−neff2, where neff1 and neff2 are the effective refractive indices of two fundamental orthogonal modes (where one can nominally be TE and the other TM in most applications). The goal is to minimize the fitness, where ideal case would have fitness substantially equal to zero—meaning that the effective refractive indices of two modes would be identical or close to identical. The effect of sidewall angle on fitness is shown in 835, where low fitness values can be achieved by adjusting the WG width, even when the sidewall angle is significantly different from 90 degrees (see darker regions in the plot). In some applications fitness<1e-2 is acceptable, in some application<1e-3 is acceptable and in some application fitness as low as <1e-4 might be required. Even though the simulated fitness for particular sidewall angle can generally be low, the performance of the PIC module might be limited, or general wafer scale yield might be limited due to fabrication imperfections such as layer thickness variation, lithography critical dimension variation, sidewall angle variation and/or others.

To remove the limitations related to process tolerances and potential layer thickness limitations, especially if high-quality LPCVD SiN is deposited (typically limited to 400 nm thickness due to stress buildup) alternative waveguide geometries can be designed, one of which is shown in 850. This waveguide geometry has two SiN depositions (T1 and T2) that can be of substantially equal thickness or can be of substantially different thickness, with an intervening cladding deposition (defining the gap G). An etch process defines the waveguide generally resulting in non-vertical sidewalls, as indicated by sidewall angle (α) being other than 90 degrees. The detailed fabrication flow will be described with the help of FIG. 9 later in the text. The main benefit of such an approach is the reduced total SiN thickness. In the exemplary case shown in 855 we show good (low) fitness (F) values that are tolerant to fabrication imperfections as shown by Monte-Carlo (MC) simulations with such reduced SiN layer thickness. In this case T1 is only ~60 nm, while T2 is only ~100 nm, meaning a total deposited SiN thickness of only 160 nm, which is significantly below the limits at which significant stress would be induced. Furthermore, as shown with MC simulations whose results are illustrated in 855, good performance is preserved even if process variations are relatively large for any of the key waveguide dimensions/parameters. In the case of ~160 nm thick SiN and the simple waveguide geometry shown in 810/830, obtaining low fitness values would require very narrow waveguides (~150 nm) which are very challenging to resolve with standard lithography. In the case of the waveguide geometry shown in 855, the waveguide width (W) is ~600 nm which is much more straightforward to resolve.

Figure 9:
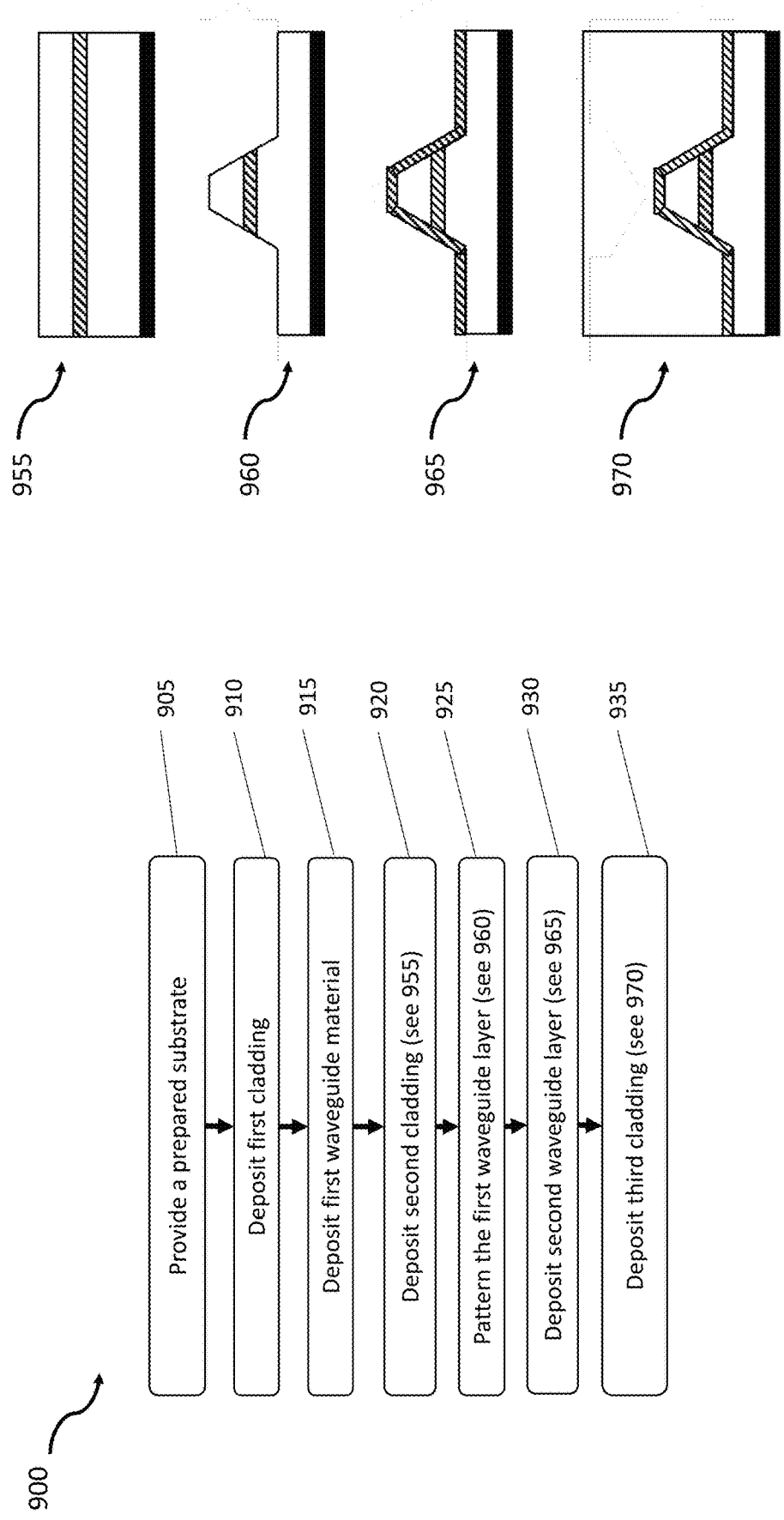
FIG. 9 is a process flow diagram of a method according to some embodiments of the present invention including cross-sections at some points in the process flow.

FIG. 9 is a process flow diagram of a method according to embodiments of the present invention, showing some of the operations carried out to make integrated devices of the types described in relation to FIG. 8 and having the waveguide geometry shown in 850.

Method 900 for making the devices need not always include all the functions, operations, or actions shown, or to include them in exactly the sequence illustrated by the sequence from blocks 905 through 935 as shown. In an exemplary case, however, method 900 begins with block, 905, in which a substrate, suitably prepared for subsequent processing steps, is provided. Such a substrate can be a silicon, fused silica, quartz and/or any other type of wafer commonly used in photonic and/or semiconductor processing.

Method 900 may then proceed from block 905 to block 910, where a first cladding, comprising one or more dielectric materials, is formed on the prepared substrate, by deposition, growth, transfer, bonding or some other well-known technique.

From block 910, method 900 may proceed to block 915 where a first waveguide material is formed by deposition, growth, transfer, bonding or some other well-known technique. A waveguide material is characterized by having a refractive index that is higher than the refractive index of the cladding material. Common waveguide materials include, but are not limited to, SiN, TiO2, Ta2O5, SiO2, Al2O3, LiNbO3, AlN, and/or Si. Block 915 defines the thickness T2 shown in 850.

From block 915, method 900 may proceed to block 920 where a second cladding material is formed by deposition, growth transfer, bonding or some other well-known technique. In some embodiments, the resulting cross-section of the substrate wafer and multiple deposited materials might look as shown in 955 where the thickness of second cladding defines the gap G shown in 850.

From block 920, method 900 may proceed to block 925 in which lithography and etch are performed to define waveguides, optical I/O and/or other components comprising the PIC module. The lithography defines the waveguide width (W) in 850. The ideal sidewall angle would be vertical (90°), but in many cases the sidewall angle is substantially different from vertical, the exact angle being dependent on materials to be etched, tools and/or techniques used for etching. This step defines the sidewall angle (α) shown in 850. In some embodiments, that angle is between 75° and 90° and the resulting cross-section might look like that shown in 960.

From block 925, method 900 may proceed to block 930 where a second waveguide material is formed by deposition, growth, transfer, bonding or some other well-known technique. Again, this waveguide material is characterized by having a refractive index that is higher than the refractive index of the cladding material used with it. Common waveguide materials include, but are not limited to, SiN, TiO2, Ta2O5, SiO2, Al2O3, LiNbO3, AlN, and/or Si. The material of second waveguide might or might not be the same as the material of the first waveguide. Block 930 defines the thickness T1 shown in 850.

From block 930, method 900 may proceed to block 935 where a third cladding material is formed by deposition, growth transfer, bonding or some other well-known technique. In some embodiments, the resulting cross-section of the substrate wafer and multiple deposited materials might look as shown in 970.

Embodiments of the optical devices described herein may be incorporated into various other devices and systems including, but not limited to, various optical networks, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
    a module comprising: an arrayed waveguide grating (AWG), and
    a filter having a filter input port, a filter output port, and a filter COMM output port, the filter operable such that a first range of wavelengths entering the filter at the filter input port is directed to the filter output port and a second range of wavelengths entering the filter at the filter input port is directed to the COMM output port;
    wherein the AWG comprises:
    an AWG input port optically coupled to the filter output port to receive the first range of wavelengths; and
    a plurality of AWG output ports;
    wherein the module further comprises a splitter/coupler (SC) comprising:
    a SC input port configured to receive an input signal comprising the first and second range of wavelengths from an optical source;
    a first SC output port, optically coupled to the filter input port such that a first fraction of optical power in the first and second ranges of wavelengths of the input signal entering the SC input port is directed to the filter input port; and
    a power monitor output port configured to deliver a second fraction, smaller than the first fraction, of the optical power in the first and second ranges of wavelengths of the input signal entering the SC input port to a power monitor output of the device.

2. The device of claim 1, wherein the SC further comprises a second SC output port.

3. The device of claim 1,
    wherein the module is formed in a photonic integrated circuit (PIC);
    wherein the SC is fabricated into the PIC; and
    wherein the filter is inserted into a cavity formed into a top surface of the PIC, coupling between the filter and the SC and coupling between the filter and the AWG being achieved by planar waveguides formed in the PIC.

4. A device comprising:
    a module formed in a photonic integrated circuit (PIC), the module comprising a module input port, N module output ports, a module COMM output port, an array of N filters, and at least one of a photodetector and an amplifier;
    wherein each of the N filters has a filter input port, a filter output port, and a filter COMM output port, the filter being operable such that a first range of wavelengths entering the filter at the filter input port is directed to the filter output port and a second range of wavelengths entering the filter at the filter input port is directed to the filter COMM output port;
    wherein, for 2<=n<=(N−1) the filter input port of the nth filter in the array is optically coupled to the filter COMM output port of the (n−1)th filter, the filter output port of the nth filter in the array is optically coupled to an nth module output port of the N module output ports, and the filter COMM output port of the nth filter in the array is optically coupled to the filter input port of the (n+1)th filter in the array;

wherein, for n=1, the filter input port of the nth filter in the array is optically coupled to the module input port such that a multi-wavelength input signal entering the module at the module input port may be received by the nth filter, and the filter output port of the nth filter in the array is optically coupled to an nth module output port; and wherein, for n=N, the filter output port of the nth filter in the array is optically coupled to an nth module output port, and the filter COMM output port of the nth filter in the array is optically coupled to the module COMM output port;

wherein each of the N filters is inserted into a corresponding cavity formed into a top surface of the PIC; and wherein coupling between the module input port and a first filter in the array, coupling between the module COMM output port and a last filter in the array, coupling between adjacent filters in the array, and coupling between each filter and a corresponding module output port is achieved by one or more waveguides formed in the PIC.

5. The device of claim 4,
wherein each of the one or more waveguides formed in the PIC comprises a first waveguide layer, having a first thickness t1, underlying a second waveguide layer, having a second thickness t2.

6. The device of claim 5, wherein t1+t2<=400 nm.

* * * * *